US005555736A

United States Patent [19]
Wills et al.

[11] Patent Number: 5,555,736
[45] Date of Patent: Sep. 17, 1996

[54] REFRIGERATION SYSTEM AND METHOD

[75] Inventors: Frank E. Wills; Dean K. Norbeck, both of York, Pa.

[73] Assignee: York International Corporation, York, Pa.

[21] Appl. No.: 465,329

[22] Filed: Jun. 5, 1995

Related U.S. Application Data

[62] Division of Ser. No. 180,067, Jan. 11, 1994, Pat. No. 5,460,009.

[51] Int. Cl.$^6$ .................................................. F25B 49/02
[52] U.S. Cl. .................................. 62/187; 62/408; 62/180
[58] Field of Search ........................... 62/187, 229, 278, 62/228.4, 180, 186, 408, 179, 89

[56] References Cited

U.S. PATENT DOCUMENTS

| | | | |
|---|---|---|---|
| 3,309,888 | 3/1967 | Jacobs | 62/278 X |
| 4,009,590 | 3/1977 | Webb et al. | 62/187 X |
| 4,920,758 | 5/1990 | Janke et al. | 62/187 |
| 5,201,888 | 4/1993 | Beach, Jr. et al. | 62/187 |
| 5,255,530 | 10/1993 | Jake | 62/229 X |

OTHER PUBLICATIONS

Ladders of Learning Training Program, Central Environmental Systems, 1988.

*Primary Examiner*—Harry B. Tanner
*Attorney, Agent, or Firm*—Finnegan, Henderson, Farabow, Garrett & Dunner, L.L.P.

[57] ABSTRACT

A refrigeration system includes a temperature sensor in a freezing compartment, a temperature sensor in a cooling compartment, an adjustable damper controlling the flow of cooled air from the freezing compartment to the cooling compartment and variable speed drives for fan motors and a compressor motor. The desired set point temperatures for the compartment are compared with the actual sensed temperatures through a controller that controls the speed of the compressor and fan motors, to achieve the desired temperature in a fast and efficient manner. When excessive ice is detected on freezing compartment coils, the controller reverses the heat transfer cycle of the refrigerant to defrost the freezing compartment coils.

12 Claims, 5 Drawing Sheets

REFRIGERATION SYSTEM AND METHOD

This is a divisional of application Ser. No. 08/180,067, filed Jan. 11, 1994 U.S. Pat. No. 5,460,009.

BACKGROUND OF THE INVENTION

1. Field of the Invention

The present invention relates to a refrigeration system and method, and more particularly to a residential refrigeration system and method having improved energy efficiency.

2. Discussion of the Related Art

A typical refrigerator has a freezing compartment for maintaining food temperatures below 32° F., and a cooling compartment for maintaining food below an ambient temperature and above 32° F. Normally, a mechanical thermostat in a space between the freezing compartment and the cooling compartment determines when a compressor in the refrigerator is activated. A manually operated mechanical damper regulates the amount of cold air transmitted from the freezing compartment to the cooling compartment to control the temperature differential between the compartments.

Sudden increases in load due to opening doors or placing warm objects into the compartments require refrigeration capacity far in excess of normal operation. Maximum capacity is determined by the size of the evaporator, condenser, and compressor of the refrigerating system. Each time the thermostat switches on, the system is operated at its maximum capacity causing temperature swings inside the compartments as large as 10° F. Thus, in response to sudden increases in load, prior art refrigerators exhibit a large positive temperature swing, a long recovery cycle and an overshoot in compartment temperatures. When the temperature overshoots below the desired set point, energy is lost through the cabinet and the refrigeration system uses more energy to achieve the differential between temperature of the compartments and ambient temperature.

Defrost of the evaporator coil by an inefficient electric resistance mechanism is another source of energy inefficiency in the typical prior art refrigerator.

SUMMARY OF THE INVENTION

It is an advantage of the invention to provide a refrigeration system and method having improved energy efficiency.

To achieve this and other advantages of the invention, a refrigeration system comprises a housing defining a first compartment and a second compartment in fluid communication with the first compartment; a sensor for sensing a temperature in one of the compartments; a refrigerant loop including a cooling coil in one of the compartments and an external coil outside the housing; control means, responsive to the sensor, for generating a variable control signal that is a function of a difference between the sensed temperature and a preselected temperature; and means for moving a fluid in the housing at a variable rate determined by the control signal.

According to another aspect of the present invention, a refrigeration system comprises a housing defining a first compartment and a second compartment in fluid communication with the first compartment; a first sensor for sensing a temperature in the first compartment; a second sensor for sensing a temperature in the second compartment; a refrigerant loop including a cooling coil for cooling one of the compartments and an external coil outside the housing; control means, responsive to the first and second sensors, for generating at least two control signals that are functions of the temperatures sensed by the first and second sensors; first means for transferring air past the cooling coil into the first compartment at a variable rate determined by the first control signal; and means for circulating refrigerant through the refrigerant loop at a variable rate determined by the second control signal.

According to another aspect of the present invention, a refrigeration system comprises a housing defining a first compartment and a second compartment in fluid communications with the first compartment; a sensor for sensing the temperature in the second compartment; means for cooling the first compartment to a temperature of less than 32° F.; means for transferring air from the first compartment to the second compartment at a variable rate that is a function of the temperature in the second compartment sensed by the sensor.

According to another aspect of the present invention, a refrigeration system comprises a housing defining a first compartment and a second compartment; means for cooling the first compartment to a temperature of less than 320° F., including a refrigerant loop with a cooling coil within the housing, an external coil outside the housing, and a compressor; a sensor for sensing a deposit of a predetermined amount of ice on the cooling coil; and means, responsive to the sensor, for circulating refrigerant in a first direction from the compressor through the external coil and then through the cooling coil when the sensor senses less than the predetermined amount of ice and for circulating refrigerant in a second, opposite direction.

According to another aspect of the present invention, a refrigeration system comprises a housing defining a first compartment and a second compartment in fluid communication with the first compartment; a first sensor for sensing a temperature in the first compartment; a second sensor for sensing a temperature in the second compartment; means for cooling the first compartment to a temperature of less than 32° F., including a refrigerant loop with a cooling coil within the housing, an external coil outside the housing, and a compressor; a sensor for sensing ice on the cooling coil; control means, responsive to the first and second sensors, for generating first, second, and third control signals; means for transferring air past the cooling coil into the first compartment at a variable rate determined by the first control signal; means for circulating refrigerant through the refrigerant loop at a variable rate determined by the second control signal; means for varying the degree of fluid communication from the first compartment to the second compartment according to the third control signal; and means, responsive to the ice sensing sensor, for circulating refrigerant in opposite directions to effect cooling or defrosting.

According to another aspect of the present invention, a method of operating a refrigeration system including a housing defining a first compartment and a second compartment, a refrigerant loop including a cooling coil for cooling one of the compartments and an external coil outside the housing, comprises the steps of sensing a temperature; generating a control signal in response to the sensing step; transferring air past the cooling coil into the first compartment at a rate determined by the control signal; and circulating refrigerant through the refrigerant loop.

According to another aspect of the present invention, a method of operating a refrigeration system including a housing defining a first compartment and a second compartment, a refrigerant loop including a cooling coil for cooling one of the compartments and an external coil outside the housing, comprises the steps of sensing a temperature; generating a control signal in response to the sensing step; and circulating refrigerant through the refrigerant loop, at a rate determined by the control signal.

According to another aspect of the present invention, a method of operating a refrigeration system including a housing defining a first compartment and a second compartment, a refrigerant loop including a cooling coil for cooling one of the compartments and an external coil outside the housing, comprises the steps of sensing a temperature; generating a control signal in response to the sensing step; transferring air past the external coil at a rate determined by the control signal; and circulating refrigerant through the refrigerant loop.

According to another aspect of the present invention, A method of operating a refrigeration system including a housing defining a first compartment and a second compartment in fluid communication with the first compartment, a refrigerant loop including a cooling coil for cooling one of the compartments and an external coil outside the housing, comprises the steps of cooling the first compartment to a temperature of less than 32° F.; and transferring air from the first compartment to the second compartment at a rate determined by a temperature in the second compartment.

According to another aspect of the present invention, a method of operating a refrigeration system including a housing defining a first compartment and a second compartment, a refrigerant loop including a cooling coil for cooling one of the compartments and an external coil outside the housing, and a compressor, comprises the steps of sensing a temperature; generating a control signal in response to the sensing step; cooling the first compartment to a temperature of less than 32° F.; sensing ice on the cooling coil; and circulating refrigerant in a first direction from the compressor through the external coil and then through the cooling coil when the sensing step senses less than a predetermined amount of ice on the cooling coil, and circulating refrigerant in a second, opposite direction.

BRIEF DESCRIPTION OF THE DRAWINGS

The accompanying drawings, which are incorporated in and which constitute a part of this specification, illustrate one embodiment of the invention and, together with the description, explain the principles of the invention. In the drawings.

DESCRIPTION OF THE PREFERRED EMBODIMENTS

Figure 1:
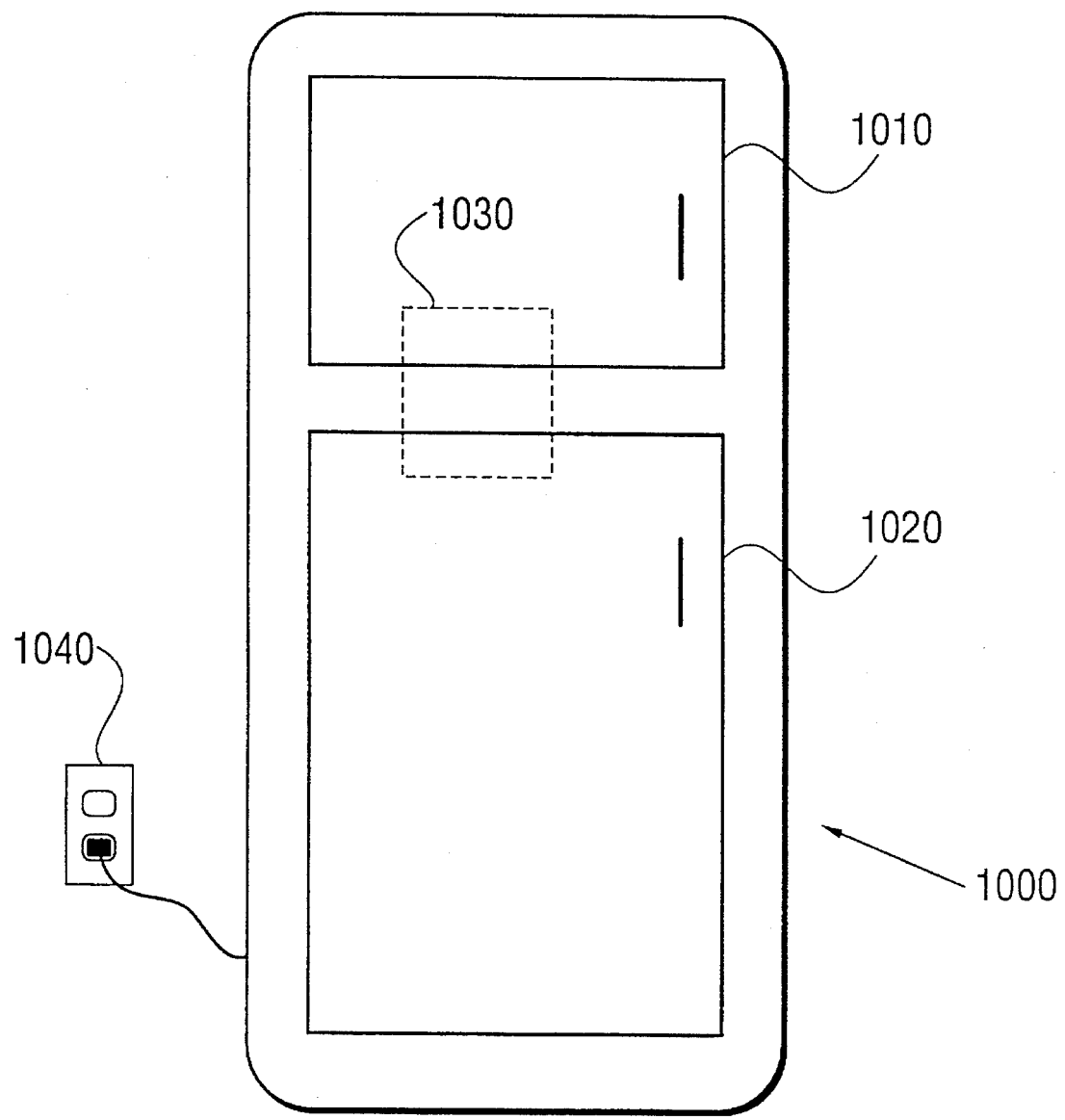
FIG. 1 is an external depiction of the preferred refrigerator of the present invention.

As shown in FIG. 1, a refrigerator according to a first preferred embodiment of the present invention is generally designated by the reference numeral 1000 and includes a freezing compartment 1010 and cooling compartment 1020. When in operation, the freezing compartment 1010 has a temperature below freezing, and the cooling compartment 1020 has a temperature below an ambient temperature and above freezing. A control unit 1030 controls the temperatures of freezing compartment 1010 and cooling compartment 1020, as described in more detail below. In the preferred embodiment disclosed in this application, a standard 110V, 60 Hz, wall outlet 1040 powers refrigerator 1000. The present invention, however, can be modified so it can be used with other power sources.

Figure 2:
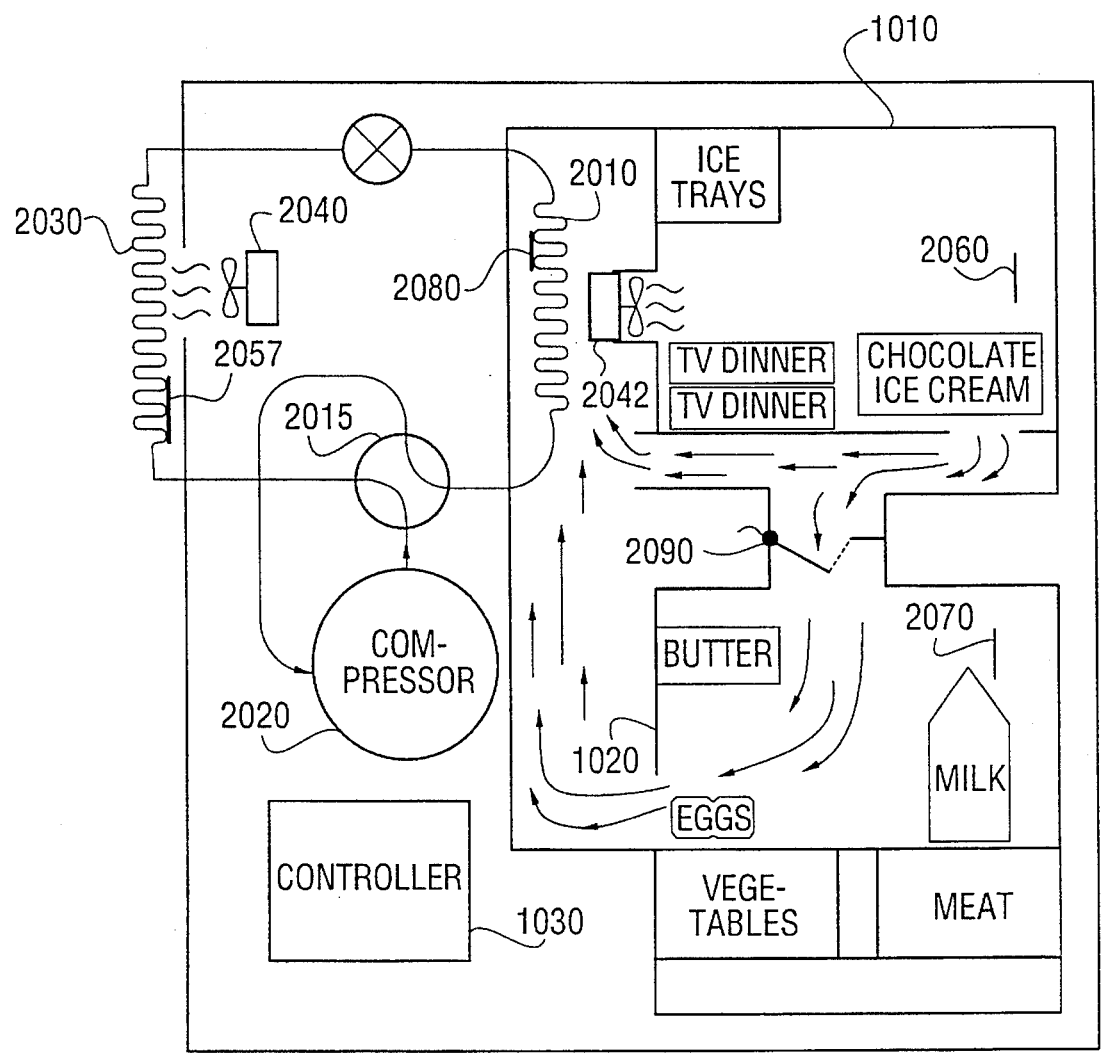
FIG. 2 is a schematic diagram illustrating one embodiment of the present invention within a residential refrigerator.

FIG. 2 is a schematic depiction of the cooling system mechanism within the refrigerator 1000. The system includes freezer coils 2010, reversing valve 2015, compressor 2020, external coils 2030, and expansion valve 2040. The reversing valve is electrically controlled so that the valve can be reversed by application of control signals. The elements are connected to each other by refrigerant tubing and form a closed systems that preferably contains a non-chlorinated refrigerant, such as R134a. The system also includes two fans, fan 2040 and 2042. Fan 2042 is a variable speed fan that circulates air past freezer coils 2010 into freezing compartment 1010, and fan 2040 is a variable speed fan that forces ambient air past external heat transfer coils 2030 to transfer the heat from freezing compartment 1010 to the ambient around the refrigerator.

The system of the preferred embodiment of the present invention also includes variable position damper 2090 that controls the amount of cold air that is circulated from freezing compartment 1010 into cooling compartment 1020. In the preferred embodiment, a pivotable damper is used, as illustrated in FIG. 2. It should be apparent to those skilled in the art, however, that other adjustable dampers could be used. Variable position damper 2090 is opened and closed by a motor or similarly electrically driven device and is configured so that an input signal of 0–5 volts causes a corresponding variation in damper position from fully closed (0 volts) to fully open (5 volts).

Compressor 2020, variable speed fan 2040, and variable speed fan 2042 each are driven by variable speed motors that include a single phase variable speed drive of the type described in U.S. Pat. No. 5,136,216 of Wills, Schnetzka and Hoffer, for AC MOTOR DRIVE SYSTEM, issued Aug. 4, 1992, the contents of which is herein incorporated by reference. In the preferred embodiment of the present invention, each drive is configured so that an input signal of 0–5 volts causes a corresponding variation in motor shaft speed of zero (0 volts) to full speed (5 volts).

As shown in FIG. 2, the system of the preferred embodiment also includes a number of temperature sensors. Temperature sensor 2057 senses a temperature of coil 2030. Temperature sensor 2060 senses freezing compartment temperature, and temperature sensor 2070 senses cooling compartment temperature. Each of these temperature sensors generate an electrical signal representative of the sensed temperature.

The system also includes a frost sensor 2080 that generates an electrical signal indicative of the amount of, or presence of a preselected deposit of, frost on coil 2080. In the preferred embodiment, frost sensor 2080 includes a light source and an optical sensor that generates a signal indicative of an amount of light received from the light source. The light source and sensor are positioned so that frost build-up on coil 2080 blocks the optical path between the light source and the optical sensor. The electrical signal from the optical sensor therefore can be used to inform the system controller when coil 2080 should be defrosted. Persons skilled in the art will recognize that other control systems could be used to measure when coil 2080 should be defrosted.

Figure 3:
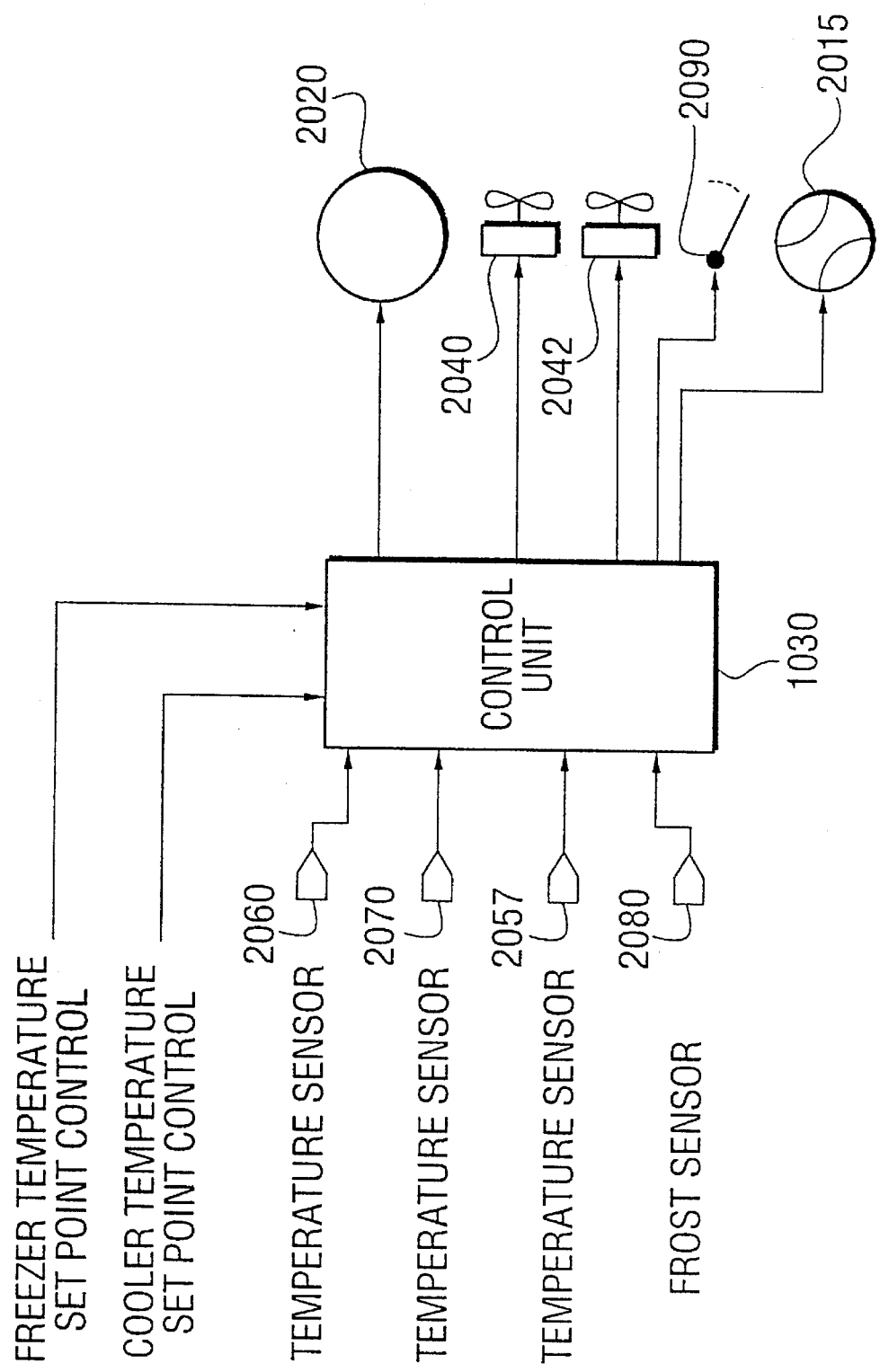
FIG. 3 is a diagram showing a control unit of an embodiment of the present invention.

Electrical signals from temperature sensors 2060, 2070, 2057, and frost sensor 2080 are applied to a control unit, which based upon the set point temperatures, preselected conditions, and sensed parameters controls the operation of the compressor 2020, fans 2040 and 2042, damper 2090, and valve 2015. As shown schematically in FIG. 3, a preferred embodiment of the present invention includes a control unit 1030 for processing signals and controlling the variable speed compressor 2020, variable speed fan 2040, variable speed fan 2042, the variable position damper 2090, and reversible valve 2015. A freezing temperature set point signal from a user manual control and a cooling temperature set point signal from a user manual control are applied to the control unit. The user manual controls may be, by means of example only, a potentiometer or an electric keypad either of which develops electrical signals representative of the desired set point temperature.

Controller 1030 can be either an analog or a digital controller. Preferably, however, controller 1030 includes a microprocessor that implements proportional-Integral-Derivative (PID) control, to minimize error between the manually specified freezing compartment temperature and the actual freezing compartment temperature, and between the manually specified cooling compartment temperature and the actual cooling compartment temperature. The sensor outputs are multiplexed and digitally coded by a conventional analog to digital converter, which is well known in the art. The microprocessor reads the digitally coded outputs via a data bus, which is also well known in the art.

In the control system of refrigerator 1000, the appropriate gain and phase shift (response time) generated in response to the set point and sensed signals are determined by program statements. To facilitate a description of the control system of refrigerator 1000, however, one version of the control system will be described in terms of an analog system, in which gain and phase are determined by resistor value ratios, resistor/capacitor (RC) configurations, and integrator/differentiator time constants. One of ordinary skill in the art could readily transcribe the following analog description into the program statements for a microprocessor.

Figure 4:
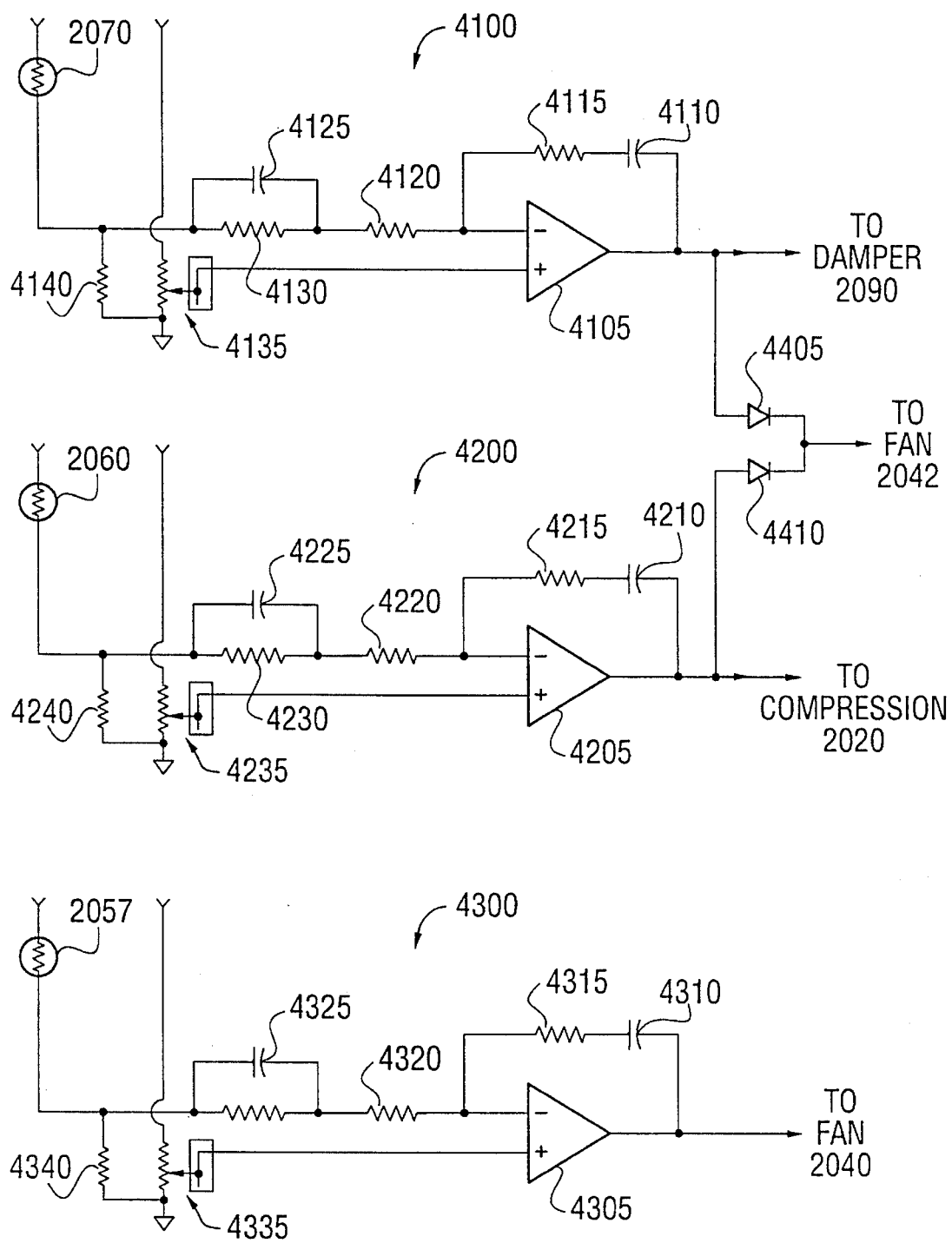
FIG. 4 is a diagram showing a control unit of an embodiment of the present invention in more detail.

FIG. 4 shows an analog representation of certain control functions of controller 1030. PID amplifier 4200 responds to a signal from temperature sensor 2060, PID amplifier 4100 responds to a temperature from temperature sensor 2070, and PID amplifier 4300 responds to a signal from temperature sensor 2057. The outputs of PID amplifiers 4200, 4100 and 4300 determine control signals that are sent to damper 2090, variable speed fan 2042, compressor 2020, and variable speed fan 2040.

PID amplifier 4200 includes differential amplifier 4205, resistor 4240, resistor 4230, resistor 4220, resistor 4215, capacitor 4225, capacitor 4210, and potentiometer 4235. Potentiometer 4235 provides a reference voltage based on the setting of the manual freezing temperature control.

A signal (from sensor 2060) representative of the sensed temperature in the freezer compartment is applied to PID amplifier 4200 and is compared with a signal representative of the desired set point temperature. Based upon the comparison and the component values of PID amplifier 4200, a control signal from the amplifier is ultimately applied to the compressor. Generally, a positive difference between the actual sensed temperature and the desired set point temperature will result in a control signal that will cause the compressor to be operated. The signal applied to the compressor will generally increase as the difference between the actual and desired temperature increases and will decrease as the difference decreases. As a result, the compressor will operate at a maximum speed when the difference exceeds a predetermined limit and will operate at lower speeds as the difference falls below that limit.

The proportional gain of PID amplifier 4200 is determined by the gain of differential amplifier 4205, which in a preferred embodiment is approximately 100 dB (100,000). The integral gain of PID amplifier 4200 is determined by the ratios of the values of resistor 4230, resistor 4220, resistor 4215, and capacitor 4210. Derivative gain is selected by the ratios of the values of capacitor 4225, resistor 4230, resistor 4220, and resistor 4215. Resistor 4240, in conjunction with a thermistor in temperature sensor 2060, provides a positive temperature coefficient voltage that is proportional to sensed temperature.

So that the application of the preferred embodiment of the invention can be understood, the response and operation of PID amplifier 4200 will be generally described for a few circumstances. If the freezing compartment temperature is substantially above the manually specified freezing temperature set point, a large error voltage appears at the output of PID amplifier 4200. As a result, PID amplifier 4200 commands compressor 2020 to operate at a relatively high speed causing the temperature of coil 2010 to drop rapidly. At the same time PID amplifier 4200 commands variable speed fan 2042 to operate at a relatively high speed to transfer air past coil 2010 into freezing compartment 1010, causing the temperature in freezing compartment 1010 to drop rapidly toward the set point.

As the set point is approached, the error voltage decreases, thereby avoiding temperature overshoot. Thus, sudden temperature changes, such as those caused by door openings, cause derivative gain increases that command rapid compressor speed and fan speed changes. As a result, energy savings is achieved by eliminating temperature swings associated with prior art refrigeration control methods. Controlling temperature swings also minimizes the possibility of freezing food in the cooling compartment and thawing food in the freezing compartment.

PID amplifier 4100 is similar in configuration and operation to PID amplifier 4200 and includes differential amplifier 4105, resistor 4140, resistor 4130, resistor 4120, resistor 4115, capacitor 4125, capacitor 4110, and potentiometer 4135. Potentiometer 4135 provides a reference voltage based on the setting of the manual cooling temperature control.

A signal (from sensor 2070) representative of the sensed temperature in the cooling compartment is applied to PID amplifier 4100 and is compared with a signal representative of the desired set point temperature. The signal generated by amplifier 4100 is similar in application to the signal generated by amplifier 4200. When there is a positive difference between the actual temperature and the desired set point, the signal from amplifier 4100 causes damper 2090 to open a position corresponding to the degree of difference.

PID amplifier 4300 also is similar in configuration and operation to PID amplifier 4200 and includes differential amplifier 4305, resistor 4340, resistor 4330, resistor 4320, resistor 4315, capacitor 4325, capacitor 4310, and potentiometer 4335. Potentiometer 4335 determines a set point temperature for external coil 2030. In the preferred embodiment, potentiometer 4335 is not directly responsive to a manual control. Instead, potentiometer 4335 has a fixed value or, alternatively, has a value that is varied automatically by controller 1030 in response to a physical condition such as ambient temperature.

A signal (from sensor 2057) representative of the sensed temperature of external coil 2030 is applied to PID amplifier 4300 and is compared with a signal representative of the set point temperature of external coil 2030, which is determined by potentiometer 4335 as described above. The signal generated by amplifier 4300 is similar in application to the signal generated by amplifier 4200. When there is a positive difference between the actual temperature of external coil 2030 and the set point of external coil 2030, a control signal will cause fan 2057 to be operated. The signal applied to the fan 2057 will generally increase as the difference between the actual and desired temperature increases and will decrease as the difference decreases. As a result, the fan 2040 will operate at a maximum speed when the difference exceeds a predetermined limit and will operate at lower speeds when the difference falls below that limit.

In the preferred embodiment, PID amplifiers 4100 and 4200 combine to control the speed of variable speed fan 2042 to cause the circulation of air from freezing heat transfer coils 2010 through freezing compartment 1010 and cooling compartment 1020. Diodes 4405 and 4410 constitute a network that transmits the maximum of the voltages of PID amplifier 4100 and 4200 to freezing fan 2042.

The activation of variable speed fan 2040 is indirectly affected by the temperature in freezing compartment 1010, since amplifier 4200 will activate compressor 2020 in response to an increase in freezing compartment temperature and the activation of compressor 2020 will raise the temperature of external coil 2030, causing amplifier 4300 to increase the speed of variable speed fan 2040. In addition, the activation of compressor 2020 is indirectly affected by the temperature in cooling compartment 1020, since amplifier 4100 will activate damper 2090 and variable speed fan 2042 in response to an increase in the temperature of cooling compartment 1020, causing an increase in the temperature of freezing compartment 1010, causing PID amplifier 4200 to increase the speed of compressor 2020.

Stability is achieved by controlling the "loop gain" i.e. the ratio of the magnitudes of input to output responses between any two disconnected points (open loop) in the control loop and the phase shift (time difference) between them. If the loop gain is less than unity and the phase shift is sufficiently less than 360 degrees at the control point, the system will be stable.

Figure 5:
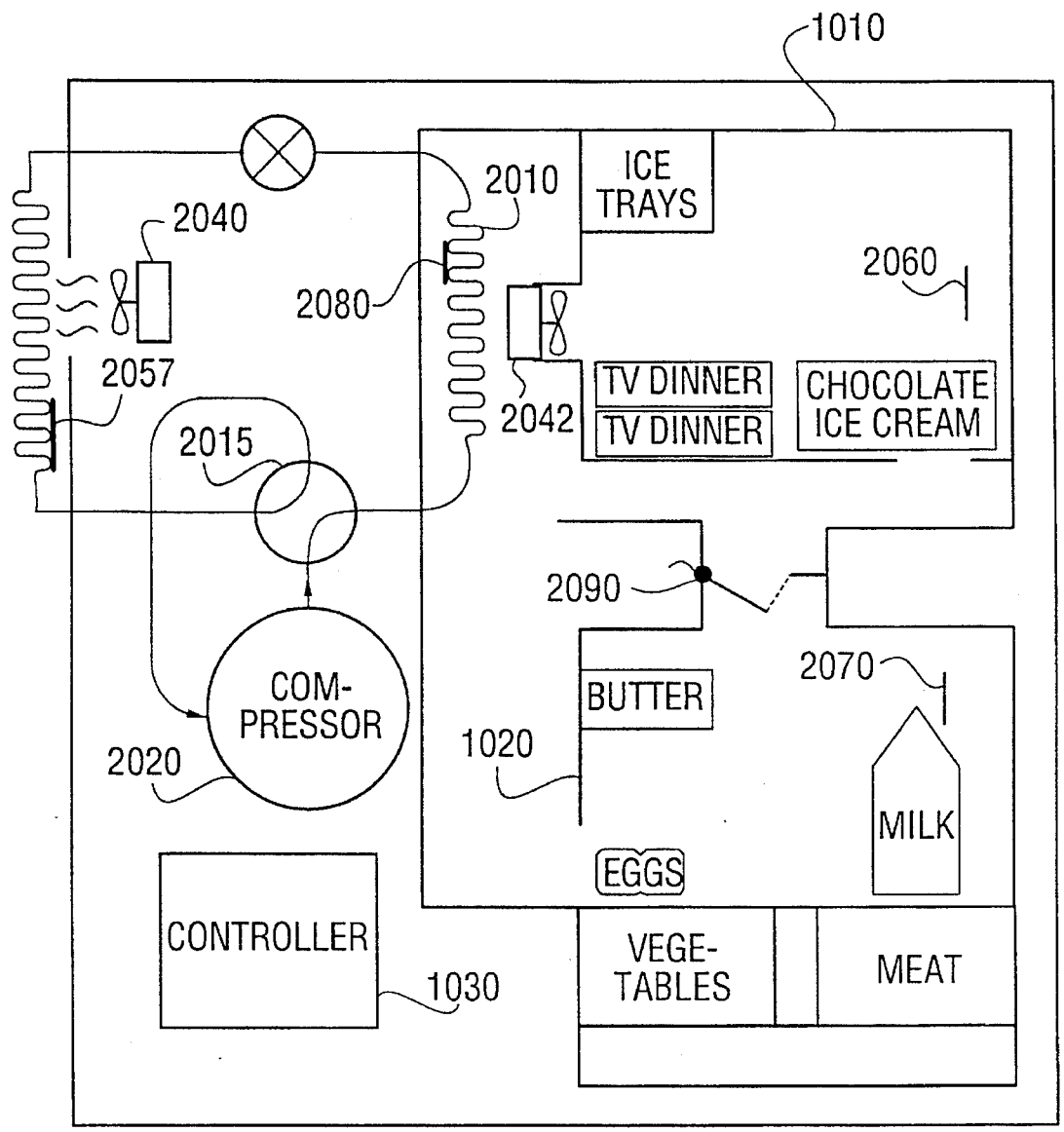
FIG. 5 is a schematic diagram illustrating a defrosting mechanism of an embodiment of the present invention.

FIG. 5 shows a defrost mechanism of refrigerator 1000. Defrost is initiated by a signal from defrost sensor 2080. Defrost sensor 2080 optically views ice build-up. Alternatively, a sensor could detect reduced air pressure caused by ice build-up on coil 2010. When defrost is detected, controller 1030 activates reversing value 2015. More specifically, ice build-up causes a reduction in the amount of light received by the optical sensor in defrost sensor 2080 causing a reduction in the voltage level of the signal sent from defrost sensor 2080 to controller 1030. When controller 1030 detects that the signal voltage from defrost sensor 2080 drops below a certain threshold, controller 1030 sends a signal to activate a solenoid in reversing valve 2015. In the preferred embodiment, the controller also includes a defrost program that will operate the compressor 2020, fans 2040 and 4042, and damper 2090 in a manner that will provide an efficient defrost of the cooling coil. The defrost program operates compressor 2020 and fan 2040 at full speed, turns fan 2042 off, and closes damper 2090.

When defrost sensor 2080 no longer detects ice build-up, the defrost cycle is terminated, reversing valve 2015 is restored to the normal position and evaporator fan 2042 is allowed to run. At this time, if the defrosting operation caused a substantial rise in the temperature in freezing compartment 1010, causing a large difference between the actual temperature in freezing compartment 1010 and the desired set point temperature of freezing compartment 1010, compressor 2020 and fan 2042 then operate at a relatively high speed to recover the compartment temperatures quickly, as described above.

Thus, defrost is achieved by reversing the refrigeration cycle, using the heat from the ambient to melt ice on freezer coil 2010. This defrosting mechanism places the heat where it is needed, in the coil tubes close to the ice, thereby conserving energy by the strategic placement of defrost heat.

As an alternative to the PID control described above, "fuzzy logic" may be employed to process signals from the temperature sensors to determine operating speeds for the compressor and fans. Fuzzy logic is a processing technique that infers conclusions from a combination of variable inputs. As applied to a preferred embodiment of the present invention, the variable inputs would be signals from sensors 2060, 2070, 2080 and 2057, and the conclusions would be the control signals applied to compressor 2020, damper 2090, and fans 2040 and 2042.

The system of the preferred embodiment of the present invention can be applied to a number of different refrigeration systems and reduces energy consumption by control of variable speed compressors and fans. In addition, the preferred embodiment of the present invention permits a reduction in cost for a given system, because the refrigeration system components may be sized for normal loads instead of transient conditions.

Additional advantages and modifications will readily occur to those skilled in the art. The invention in its broader aspects is therefore not limited to the specific details, representative apparatus, and illustrative examples shown and described. Various modifications and variations can be made to the present invention without departing from the scope or spirit of the invention, and it is intended that the present invention cover the modifications and variations provided they come within the scope of the appended claims and their equivalents.

What is claimed is:

1. A refrigeration system comprising:
    a housing defining a first compartment and a second compartment in fluid communications with the first compartment;
    a first sensor for sensing the temperature in the second compartment;
    first cooling means, connected to the first compartment, for cooling the first compartment to a temperature of less than 32° F.;
    second cooling means, connecting the first and second compartments, for cooling the second compartment, said second cooling means comprising means for transferring air from the first compartment to the second compartment at a variable rate that is a function of the temperature in the second compartment sensed by the first sensor.

2. The refrigeration system of claim 1 wherein the air transferring means includes a variable position damper.

3. The refrigeration system of claim 1 wherein the air transferring means includes a variable speed fan.

4. The refrigeration system according to claim 1, wherein the first cooling means comprises a refrigerant loop including a cooling coil in one of the compartments and an external coil outside the housing, and wherein the means for transferring comprises:
   control means, responsive to the first sensor, for generating a variable control signal that is a function of a difference between the sensed temperature and a preselected temperature; and
   means for moving a fluid in the housing at a variable rate determined by the control signal.

5. The refrigeration system according to claim 4, wherein the moving means includes means for moving air.

6. The refrigeration system according to claim 5, wherein the moving means includes a variable speed fan for transferring air past the cooling coil and into the first and second compartments and a damper that controls the size of an opening permitting air flow from the first compartment to the second compartment.

7. The refrigeration system according to claim 6, wherein the damper is a variable position damper and wherein the control signal determines the degree to which the damper is open.

8. The refrigeration system according to claim 4, wherein the moving means includes means for moving refrigerant in the refrigerant loop.

9. The refrigeration system according to claim 4, wherein the moving means includes a variable speed compressor that moves refrigerant through the refrigerant loop.

10. The refrigeration system according to claim 1, wherein the first cooling means comprises a refrigerant loop including a cooling coil within the housing, an external coil outside the housing, and a compressor, the system further comprising:
   a second sensor for sensing a deposit of a predetermined amount of ice on the cooling coil; and
   means, responsive to the second sensor, for circulating refrigerant in a first direction from the compressor through the external coil and then through the cooling coil when the second sensor senses less than the predetermined amount of ice and for circulating refrigerant in a second, opposite direction when the second sensor senses at least the predetermined amount of ice.

11. The refrigeration system of claim 1, wherein the first cooling means comprises means for directly cooling only the first compartment.

12. A method of operating a refrigeration system including a housing defining a first compartment and a second compartment in fluid communication with the first compartment, a refrigerant loop including a cooling coil for cooling the first compartment and an external coil outside the housing, the method comprising the steps of:
   cooling the first compartment using the cooling coil to a temperature of less than 32° F.; and
   transferring air from the first compartment to the second compartment to cool the second compartment at a rate determined by a temperature in the second compartment.

* * * * *